April 13, 1937.  W. F. STANTON  2,076,679
FUEL MIXTURE CONTROL
Filed April 13, 1936   5 Sheets-Sheet 2
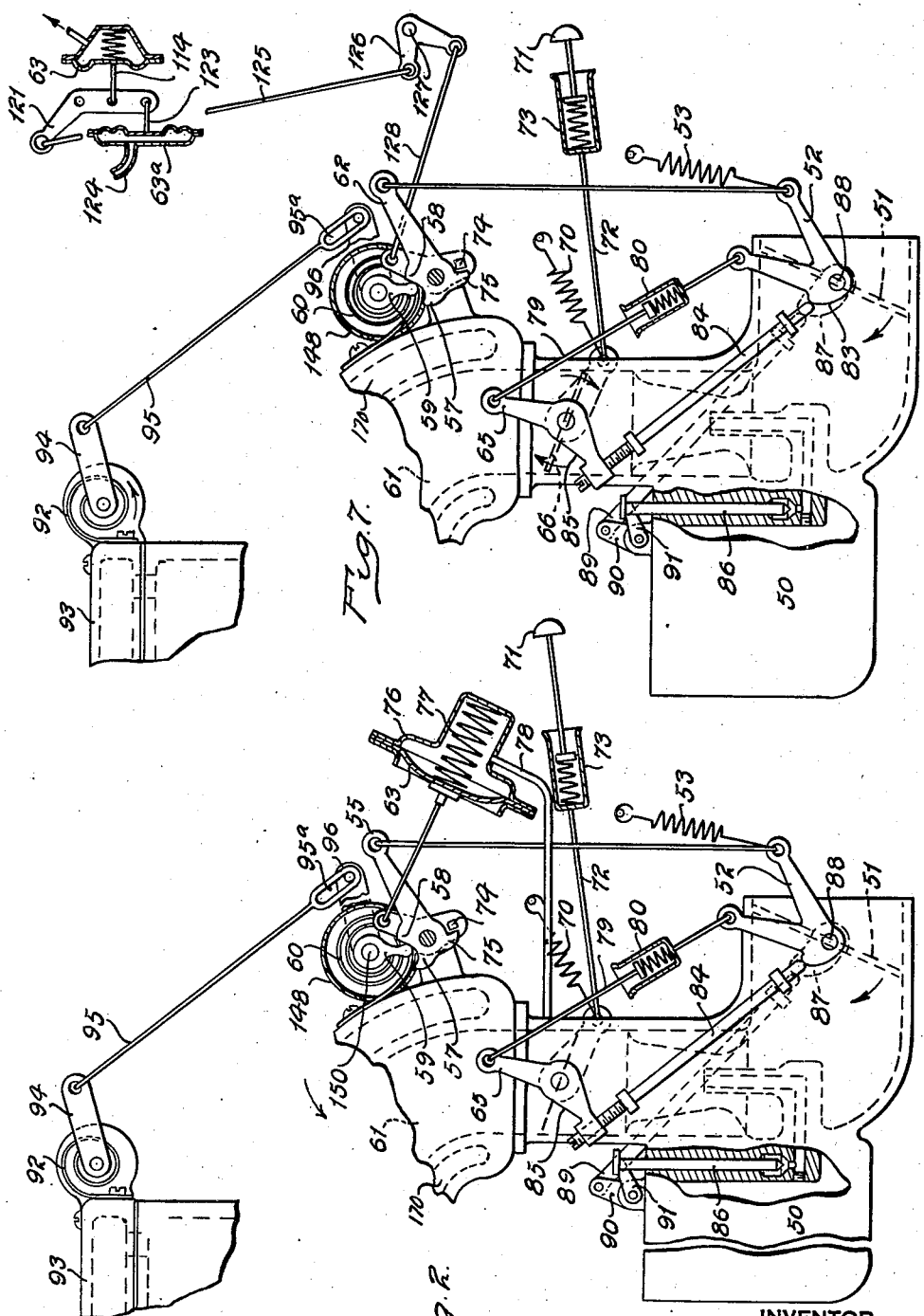
INVENTOR
WARREN F. STANTON.
BY
ATTORNEY April 13, 1937.                W. F. STANTON                2,076,679
                             FUEL MIXTURE CONTROL
                            Filed April 13, 1936          5 Sheets—Sheet 3
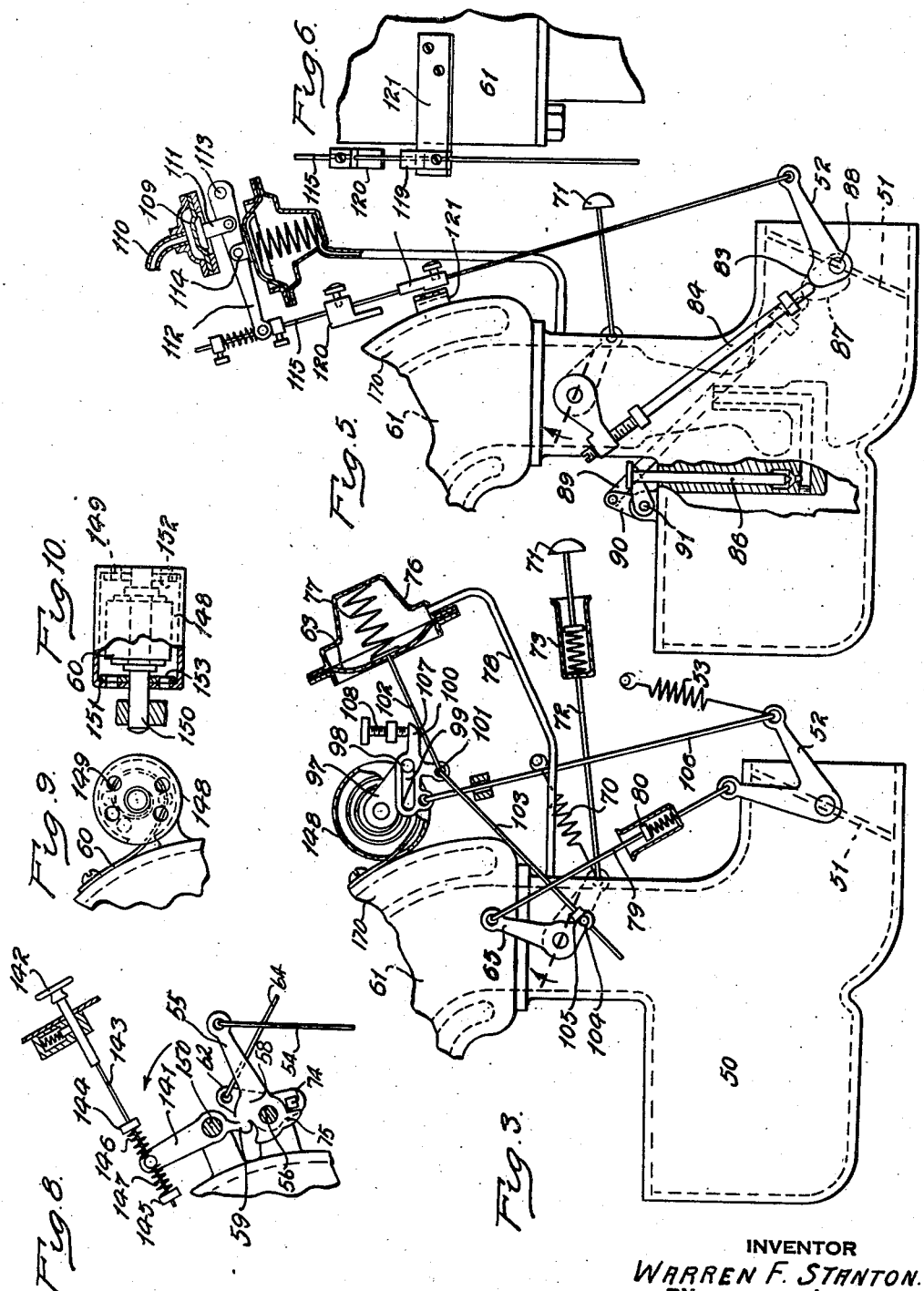
INVENTOR
WARREN F. STANTON.
BY
ATTORNEY April 13, 1937.  W. F. STANTON  2,076,679
FUEL MIXTURE CONTROL
Filed April 13, 1936    5 Sheets-Sheet 4
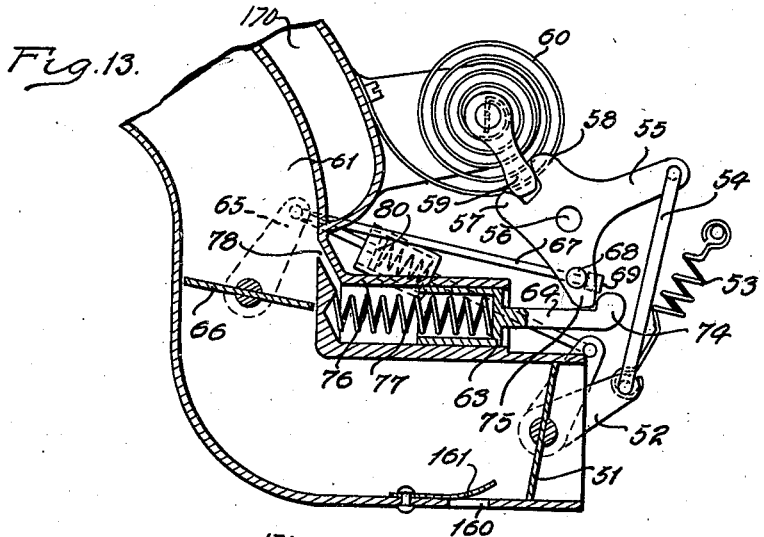
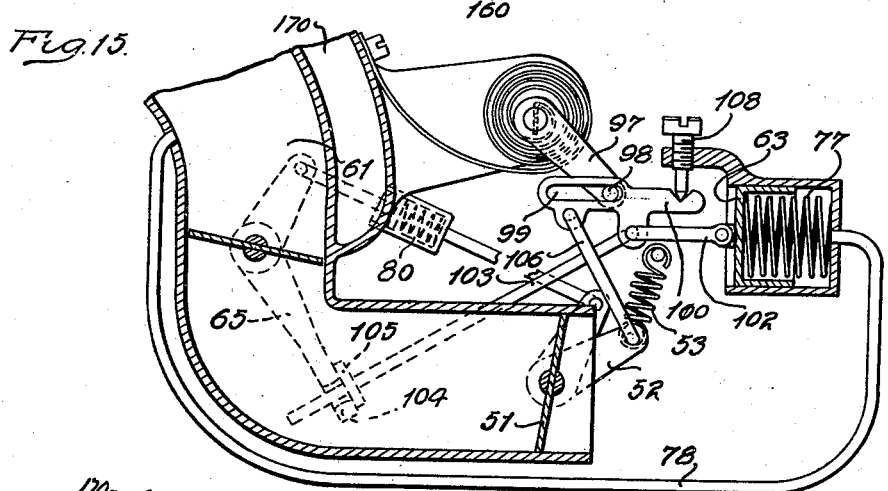
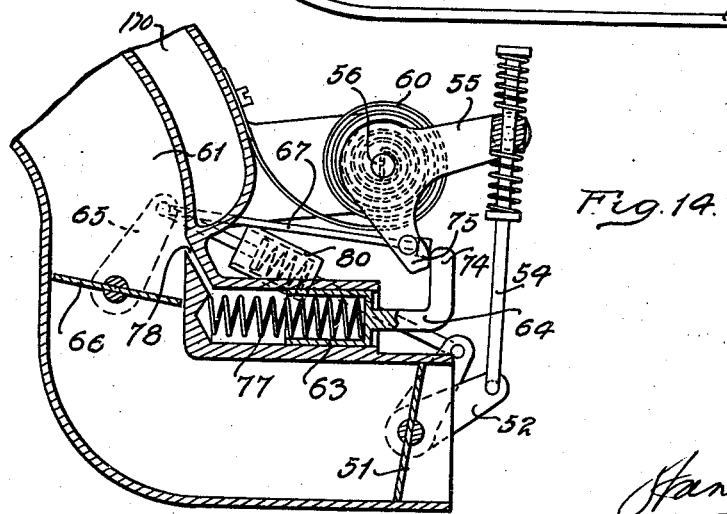
INVENTOR
WARREN F. STANTON.
BY
ATTORNEY April 13, 1937. W. F. STANTON 2,076,679
FUEL MIXTURE CONTROL
Filed April 13, 1936 5 Sheets-Sheet 5

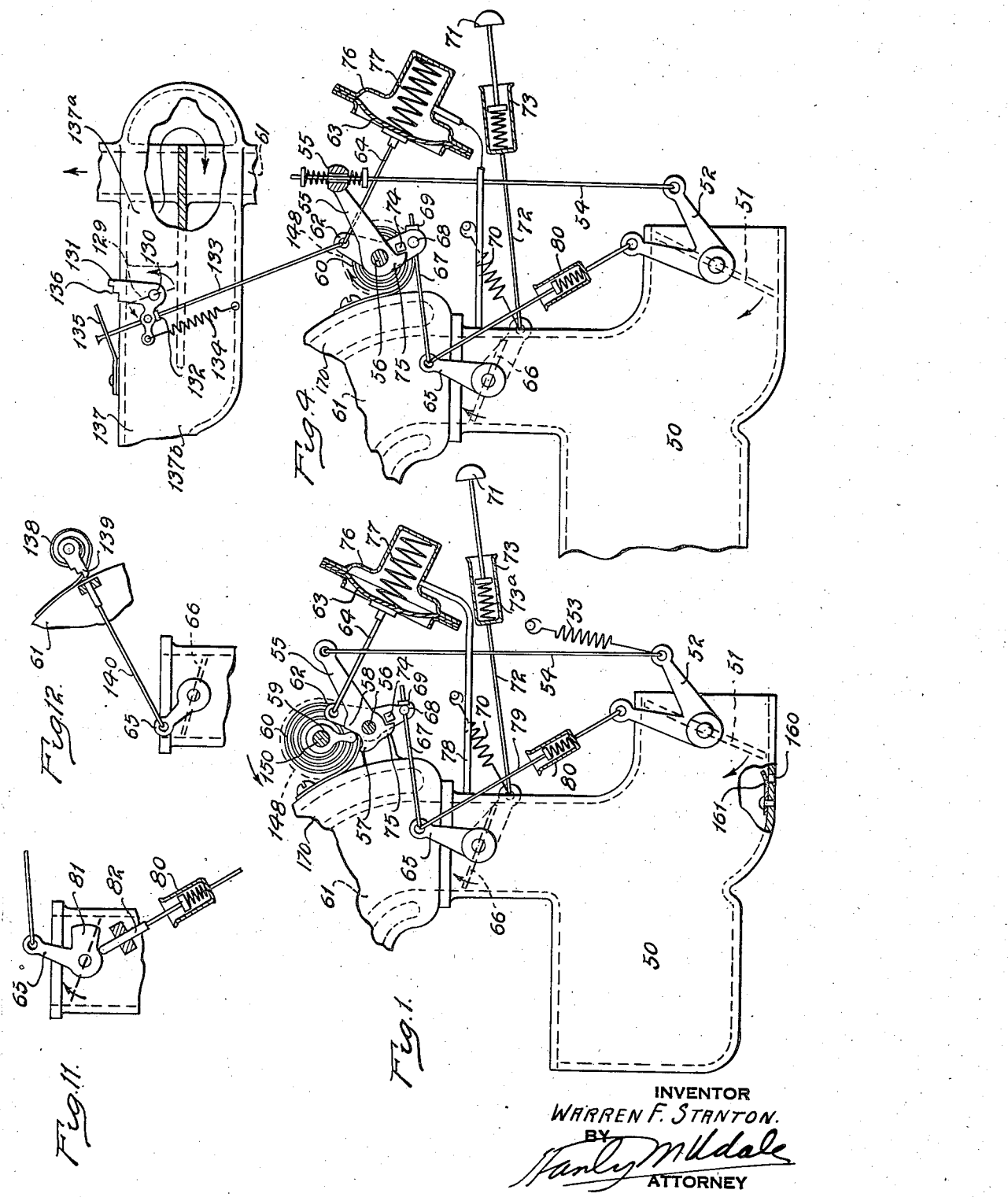

INVENTOR.
WARREN F. STANTON.
BY
ATTORNEY.

Patented Apr. 13, 1937

2,076,679

UNITED STATES PATENT OFFICE 2,076,679

FUEL MIXTURE CONTROL

Warren F. Stanton, Pawtucket, R. I.

Application April 13, 1936, Serial No. 74,081

7 Claims. (Cl. 123—119)

Taking the case of an explosion or internal combustion engine to exemplify the invention, the nature of the fuel mixture, gasoline and air; that is, the proportion of gas and air, should vary under the varying operating conditions of the engine, a rich mixture being required under certain conditions and a lean or leaner under other operating conditions. The mixture, of course, should be just that which is most suitable to the engine conditions at the time, for the most efficient and otherwise satisfactory use of fuel. There are, broadly, three operating conditions to which the mixture should be adapted, as to richness or leanness. They are (1) starting of a dead engine, (2) idling, and (3) running. And a factor to be reckoned with in each of these conditions is the engine temperature.

The important object of my invention is to assure that fuel mixture which is best fitted for the requirements of each operating condition and varying the mixture from time to time in correspondence with the varied requirements, and another object is to accomplish this by means that causes the mixture variation automatically by causing movement of the actuating parts from the mixture using instrumentality itself, that is to say the engine itself, if it is an internal combustion engine that is dealt with.

I will describe or explain my invention in relation to an internal combustion engine having a conventional carburetor.

The nature of the fuel mixture with a conventional carburetor is controlled by a choke valve, or means for cutting off the air supply to the carburetor. Cutting off air supply results in enriching the mixture and increasing air leans the mixture. And the amount of throttle opening affects the mixture by varying the turbulence of the flowing mixture and thereby affecting the admixture of the air and gasoline components.

I find it impossible to obtain satisfactory control by temperature alone, since with a cool start the thermostat has little or no action for a considerable period of time, and since the degree of wetness of the inlet manifold at a given instant, with its effect on the running of the engine at that time, determines the amount of fuel required, and temperature does not follow this wetness condition. As the firing conditions of the engine depend upon this degree of wetness, and as the firing conditions affect the engine cylinder pressure, exhaust manifold pressure, and inlet manifold pressure so that these pressures vary instantaneously with the condition of the mixture, I use these various pressures, either singly or in combination, as a primary means of controlling the mixture through choke and throttle valve, and use the mixture temperature or/and the water jacket temperature as a modifying or limiting means, as by use of a thermostat or temperature responsive device.

Another important feature of my invention is the production of positive unchoke by throttle action. Flooring the accelerator pedal to open the throttle fully, completely unchokes the engine, as does closing the throttle, so that the car drives the engine with its accompanying very high vacuum.

Another important feature of my invention is the use of a thermostat that is yielding for the first portion of its range of action and unyielding for the latter portion. This permits pressure and throttle control of the choke through most of the thermostat temperature range and finally a lockout of the choke by the thermostat at high temperature.

I also provide for the thermostat to continue its expansion freely when hot, thus preventing such damage to it as would happen if its expanding movement should be positively stopped.

With my invention for mixture control, the primary consideration is the firing conditions of the engine itself supplemented or modified by engine heat conditions, and by manual operation of the throttle.

*Starting.*—The mixture going through the intake manifold, when the engine is cranked is infinitely lean. In order that the engine may start firing, a rich mixture should be instantly supplied and the throttle should be partially opened to produce sufficient fuel supply to the starting up engine. To assure a rich mixture, the carburetor must be choked, that is its air supply must be cut off, or diminished. The degree of choking, or diminution of air supply will depend on the engine temperature. A cold engine requires a rich mixture and a warm or hot engine a leaner mixture, taking account of the vaporizing effect on gasoline of its contact with the heated surfaces of the engine. Features of my invention are means for closing the choke valve during starting and regulating the degree of closure according to engine conditions, and to hold the throttle partially open to assure sufficient fuel supply.

*Idling cold.*—Immediately the engine starts firing it should be supplied with a leaner mixture than that used in starting, as the mixture required for starting is too rich. Since the engine is cold, or has no high enough temperature that low temperature cannot be utilized to operate instrumentalities to lean the mixture, but the intake manifold vacuum can be so utilized and a feature of my invention is the use of such vacuum to unchoke as by opening the air valve. This is possible because immediately the engine starts firing, the intake vacuum increases to a degree that I can use it. The engine speed will vary as the fuel mixture varies from opening and closing the choke, and it results that by controlling the choke by the vacuum, I assure a proper mixture to maintain idling speed of the engine.

Maintenance of idling speed is also dependent on proper throttle opening, and the degree of opening should vary with engine temperature. With a cold engine, the throttle opening should be greater than with a warm engine. It is a feature of my invention to utilize the vacuum to control the degree of throttle opening and to so control it that more than normal idling speed is maintained with a cold engine, so that when the speed drops, with consequent reduction of vacuum, the throttle opens slightly, or enough to prevent engine stalling and thus maintains a non-stalling condition. I may say at this point that another feature of my invention concerns the automatic maintenance of a non-stalling condition during idling as pointed out more fully hereinafter.

*Idling warm and hot.*—During warming up, the mixture should be gradually leaned, and a feature of my invention is to accomplish that and automatically by cutting down the amount of choke, and closing the throttle slightly, the latter being desirable because as the engine warms up, its speed with the same throttle opening will tend to increase. With a warm engine, there is an increase in thermal efficiency and decrease of internal friction that result in speed increase. I utilize the engine temperature, as by thermostatic means to limit the actuation of the air valve and throttle valve.

I find the most efficient temperature control to be one that utilizes the temperature of both the heated mixture and the heated water. The mixture heat rises rapidly as the engine warms up on starting and is, therefore, ideal to control the choke on starting and warming up. Such heat, however, decreases very rapidly when the engine stops. But the water temperature and therefore the engine temperature continues high even after the engine stops. The advantage of using both, as I prefer, is therefore apparent. Control by mixture temperature alone while efficient at the start, is not efficient when the engine stops, because of rapid loss of mixture temperature. Control by the water, or engine temperature is not efficient at the starting of a cold engine, but is efficient when the engine stops. The use of the two sources of heat or temperature enables the deficiency of one to be compensated by the other. However, sufficient nicety of control for practical purposes, especially for the sake of simplicity of parts, may be had by using one, and preferably the mixture heat. If but one thermostat is used, by allowing the thermostat to over-run after a certain temperature is reached, that with the lapse of time for it to return to operative condition upon cooling, approximates the lag accomplished by the use of two thermostats.

*Running cold.*—A properly proportioned mixture must be maintained for running. Too lean mixture results in back-fire through the carburetor, audibly, or otherwise. This reduces the manifold vacuum, and this is available to partially choke the carburetor to enrich the mixture, as hereinbefore explained. With too rich a mixture, the engine "bucks", and the instinctive act of the driver is either to step on the accelerator to give more gas, or to release the accelerator. It is a feature of my invention to utilize each of these actions to unchoke the carburetor and thereby lean the mixture and clear the engine.

With a cold engine, it is desirable the throttle should not be capable of complete opening. This is so because, first, better atomization can be obtained because of increased turbulence and change in vapor pressure of the fuel, and, second, because of hurtful effects from running a cold engine at high speed. A feature of my invention is to prevent full throttle opening when the engine is cold.

When, as in coasting, the car drives the engine, it is desirable to have a lean mixture. I assure a properly lean mixture by using the intake manifold vacuum, as that can be advantageously done because that vacuum increases greatly when the car drives the engine, and that vacuum increase unchokes the carburetor and leans the mixture.

*Running warm and hot.*—In running with a warmed, or heated engine, the mixture should be leaned in correspondence with the engine temperature, and with the engine highly heated there should be no choke, and under this condition it should be possible completely to open the throttle. I do this by causing temperature responsive devices to limit the degree of choke or unchoke as the engine warms up and to set the throttle control so that the throttle may be fully opened.

*Non-stalling.*—Prevention of stalling is important at all times, but especially when the car has a free-wheeling equipment, or unit. Then the car does not drive the engine when coasting and with the engine idling, it may stop. If this happens, it may be very dangerous, as for example when passing or crossing cars in traffic, and starting of the dead engine is necessary. As by my invention the throttle opening is controlled by the intake manifold pressure, or vacuum, it follows that when the manifold pressure decreases from the slowing down of the stopping engine, the throttle at once opens, and the engine continues to run.

*Other features of my invention.*—I also provide, to control the mixture in conjunction with the intake manifold vacuum, the use of either the engine pressure or the exhaust manifold pressure. And where simpler installation is desirable, I use a hand control in place of automatically acting means which acts in conjunction with the intake manifold pressure. I also may control by-passing hot gases around the intake manifold to heat it.

In connection with the heat responsive devices or thermostats, the amount of heat radiation may be regulated so as to give a quick pick-up from a cold start by minimum of radiation. Overheating is prevented and a retarding effect produced in the action of the thermostat as it grows hot as in that condition radiation is increased. And too sudden cooling off of the thermostat is prevented by cutting off radiation therefrom.

I do not restrict myself to an embodiment of my invention which will contain all or any number of the features or the devices before mentioned and hereinafter to be described, but my invention is to be understood as consisting in whatever is described by or is included within the terms or scope or legal meaning of the appended claims.

Because it makes for clarity of illustration, the annexed drawings will be found diagrammatic in many respects. In such drawings:

Figure 1 is a side elevation with parts in section of an embodiment of my invention shown applied to a gas engine carburetor, the automatic control being by use of the intake manifold vacuum and temperature;

Figure 2 is a similar view of another embodiment of my invention, the automatic control means utilizing the water jacket temperature;

Figure 3 is a similar view of another embodiment of my invention;

Figure 4 is a view similar to Figure 1 with the addition of means to control passage of heated exhaust gases through the heater manifold;

Figure 5 is a view similar to the figures illustrating an embodiment of my invention in which the automatic control is by the intake manifold pressure and temperature and cylinder pressure;

Figure 6 is a side view of a portion of what is shown in Figure 5;

Figure 7 is a similar view illustrating an embodiment of my invention for control by intake manifold pressure and temperature, and exhaust manifold pressure;

Figure 8 is a detail view partly in section and partly in elevation illustrating an embodiment of my invention in which control is effected by use of intake manifold pressure and by hand;

Figures 9 and 10 are, respectively, detail views of a thermostat damper or ventilator;

Figure 11 is a detail view showing an embodiment of my invention in which the connection between the choke and throttle includes a cam;

Figure 12 is a detail view showing a temperature-operated throttle latch;

Figure 13 is a more diagrammatic representation of the construction shown in Figure 1;

Figure 14 is a more diagrammatic drawing of the parts shown in Figure 4;

Figure 15 is a more diagrammatic illustration of the parts shown in Figure 3.

Corresponding parts in the various figures are designated by the same reference numerals.

Figure 16:
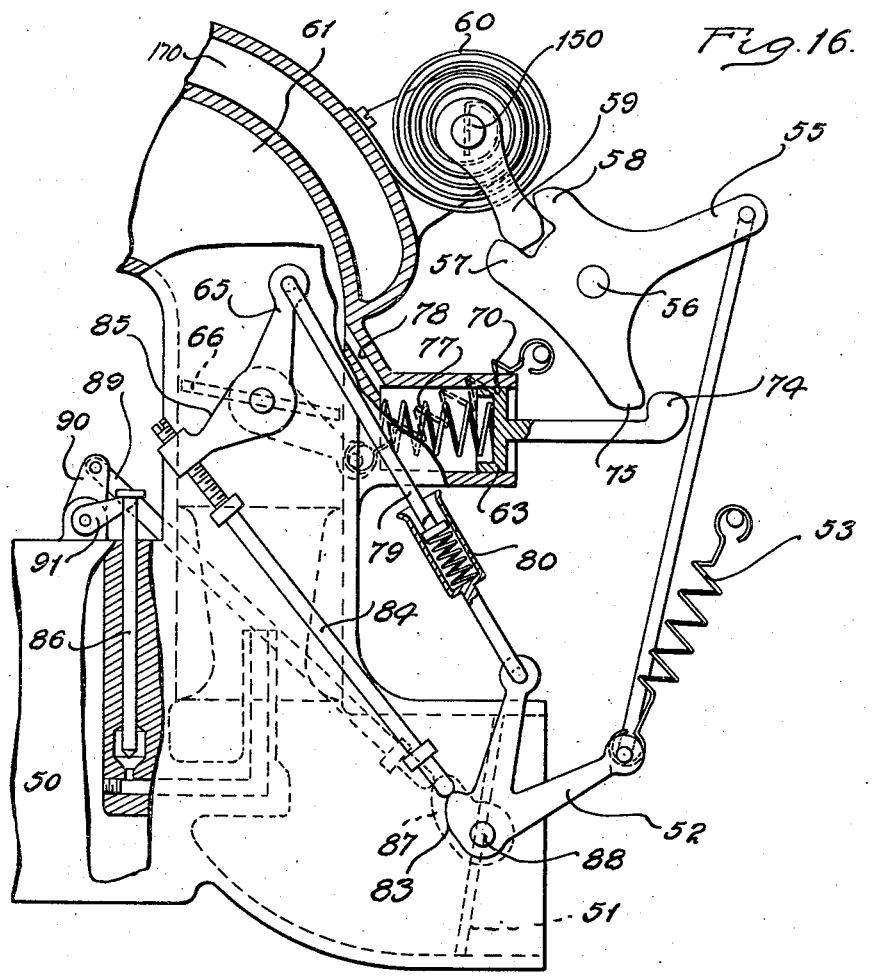
Figure 16 is a similar simplification of Figure 2.

I will now describe the embodiments of my invention by reference to the drawings, referring when necessary to particular figures.

Carburetor 50 has an air inlet with a choke valve 51, operated by lever 52, movement in the direction of the arrow opening the choke. This valve is normally held closed by spring 53, and is connected by rod 54, with lever 55, pivoted freely on pin 56. Lever 55 has two jaws 57 and 58, with which coacts an arm 59, attached to and rotated by thermostat 60. Thermostat 60 is screwed to intake manifold 61, the position being selected for the best representative condition of mixture temperature. The intake manifold 61 is provided with a heating jacket 170 preferably heated with exhaust gases. Heating of the thermostat causes it to rotate pin 150, attached thereto and to rotate arm 59, in the direction indicated by the arrow. Also pivoted freely on pin 56, is lever 62, to one arm of which is connected diaphragm 63, by rod 64. Another arm is connected to throttle lever 65, of throttle valve 66, by rod 67, which slides through pin 68, held in arm 62, and has fastened to it a collar 69, so that rod 67 is free to slide through pin 68, in one direction, but not the other. When arm 62 rotates counterclockwise, it operates lever 65, to open the throttle valve, but when it rotates clockwise, it does not operate throttle valve 66.

Throttle 66 is normally held closed by spring 70, and is manually opened by pedal 71, operating rod 72, through the slip joint 73. Arm 62 has on it a stop lug 74, with which a finger 75, on lever 55 may coact. Diaphragm 63 is held in a housing 76, and is normally held in the position shown by spring 77. The interior of housing 76 is connected with the intake manifold by tube 78, so that diaphragm 63 is subject to the pressure in the intake manifold.

Throttle lever 65 is also connected with choke lever 52, by rod 79, and slip joint 80 (Fig. 1) or it may be operatively connected with lever 52, by cam 81, on lever 65, rod 82 and slip joint 80, as illustrated in Fig. 11. A different connection between lever 52, and lever 65, may be provided through cam 83, on lever 52, rod 84, and arm 85 (Fig. 5). The purpose of these connections is hereinafter explained.

Additional enrichment of the mixture may be caused when choke valve 51 is closed, as shown in Figures 2, 5 and 7, by an auxiliary by-pass valve 86, operated by a cam 87, attached to stud 88, on which valve 51 is pivoted. The cam 87 acts on one end of rod 89, movement of which rocks levers 90 and 91 to lift valve 86.

I may also provide (see Fig. 2) a second thermostat 92, attached to and heat responsive to temperature of the waterjacket 93, which by crank 94, rod 95, and lever 96 acts in conjunction with thermostat 60, upon lever 55, and choke and throttle valve.

It may be necessary to provide means for preventing too great enrichment of the mixture when starting. This (see Fig. 1) I accomplish by providing an auxiliary air inlet port 160, normally closed by spring flap valve 161, but which may be opened by the suction in the intake manifold upon the instant of starting, and thus slightly lean the mixture.

In Fig. 3 are different operative connections between thermostat 60, and choke and throttle levers. Thermostat 60 has a pin 98, in a slot 99, on lever 100. This lever is connected by arm 101, and rod 102, with diaphragm 63, and with lever 65 by rod 103, which is slidable through pin 104, on lever 65, and is provided with a stop collar 105, so that movement in one direction of rod 103, operates lever 65, but movement in the other direction does not operate this lever. Lever 100 is also connected with choke lever 52, by rod 106 and has an arm 107, with which an adjustable stop screw 108 abuts that forms a fulcrum or pivot for lever 100.

As illustrated in Fig. 5, I may control the action of choke and throttle by inlet manifold pressure by diaphragm 63 and by engine pressure (preferably by a timed sample of said pressure) by diaphragm 109, which by pipe 110, is operatively connected directly with the cylinder, and by plunger 111, is connected with lever 112, pivoted at 113, and to which diaphragm 63, is also connected by plunger 114. Arm 112 by means of rod 115, and collar 116, positively actuates choke lever 52, and through cam 83 and rod 84, actuates throttle valve 66, and by means of collar 117, and spring 118, yieldably operates lever 52, in the other direction. On rod 115 are stop collars 119 and 120, which coact with thermostat 121 bolted to intake manifold 61.

Referring to Fig. 7, it will be seen, I provide means for operating arm 62, by the combination of intake manifold pressure, through diaphragm 63, and exhaust manifold pressure through diaphragm 63a, these diaphragms being, respectively, connected to lever 121, pivoted at 122, by plungers 114 and 123, respectively, and diaphragm 63a being connected with the exhaust manifold by tube 124. Lever 121 is connected to arm 62 by rod 125, lever 126, pivoted at 127 and rod 128.

Referring to Fig. 4, provision is made to control flow of exhaust gases around the intake manifold by a butterfly valve 129, fastened to stud 130, which valve is operated by lever 131. This valve 129 is normally held closed by stop collar 132 on rod 133, connected with arm 62, and is opened by spring 134, when arm 62 moves in a clockwise direction. It may be prevented from being opened by thermostat 135, coacting with a series of notches 136, on lever 131, thermostat 135 being in position to prevent opening when the heater manifold 137 is cold and being in a clear position, as shown, when manifold 137 is hot. By changing the relation of valve 129 and arm 131, and reversing the action of thermostat 135, I maintain an open manifold heater diaphragm position with an open throttle and vice versa. Similar results may be obtained by eliminating thermostat 135, and connecting rod 133, with lever 55, or arm 131 may be connected to both arm 62 and arm 55.

As shown in Fig. 12, a stop may be actuated to prevent opening of throttle 66, when the engine is cold by a thermostat 138, bolted to intake manifold 61. Pivoted arm 139 and rod 140, controlled in their movement by thermostat 138, prevent opening of throttle 66, while the engine is cold, but allow opening of throttle 66, when the engine is warm.

In Figure 8 is shown a manual means to take the place of the thermostat shown in Figure 1. The corresponding parts are given similar numbers. In addition, there is a dash control 142 which is connected through a wire 143 to the lever 141. Springs 146 and 147 engaging the shoulders 144 and 145 mounted on the wire 143 permit a certain amount of flexibility in the assembly of the device. However, the springs are sufficiently stiff so that the movement of the button 142 causes the lever 141 to move to the left or right as the case may be. When the engine is warm, the button 142 is pressed down, the lever 141 moves counter-clockwise on the pivot 150 and the arm 59 moves to the right and rotates the lever 55 in a clockwise direction, the arm 59 engaging with a cam surface on the center portion 58 of the lever 55. A rod 64 is connected, as shown in Figure 1, to a diaphragm 63, and is also connected to a lever 62 also mounted on the shaft 56. This lever 62 carries a stop 74 which engages with the stop 75 on the lever 55. It is thus seen that either by depressing the button 142 or by an increase in suction acting on the vacuum operated diaphragm 63 (not shown) engaging with the rod 64, the lever 55 is turned in a clockwise direction and the rod 54 descends. This rod 54 is connected, as shown in Figure 1, to the choke valve 51 so that the descent of the rod 54 opens the choke valve.

In Figures 9 and 10, I show, in detail, a ventilator or damper for thermostat 60. The latter is enclosed in a housing 148, the ends of which are perforated with holes 149. Attached to pivot rod 150, to which thermostat 60 is fastened, and which is rotated by the latter, are shutters 151 and 152, also provided with holes 153, so that as the thermostat heats up and rotates rod 150, holes 153 are brought into juxtaposition with holes 149, in housing 148. Ventilation and heat transfer are thus afforded. When the thermostat 60 is cold, holes 153 and 149 are out of juxtaposition, thus closing housing 148, to the outside air and allowing the minimum of heat transfer.

Describing the operation of the devices shown, and first considering control by the inlet manifold pressure and a single thermostat operated by the mixture temperature, as illustrated in Fig. 1, with the engine stopped and cold, thermostat 60 is completely contracted, and arm 59 is in the position shown, pressure in the intake manifold is atmospheric and spring 77, by rod 64, holds arm 62, in the position shown, so that stop 74 allows spring 53 to move lever 55, to the position illustrated, and thus by rod 54, and lever 52, to close choke valve 51. In this position arm 62 also partially opens throttle 66, beyond the normal idling position by collar 69, rod 67, and lever 65, against the tension of spring 70, which constantly tends to close the throttle, but which is less powerful than spring 77. Thus the engine is completely choked and the throttle partially opened, providing the proper condition for starting.

If the engine while stopped is warm or hot, thermostat 60 will have expanded, thus moving arm 59 in counterclockwise direction, and by jaw 58 preventing lever 55 from assuming full choke position, the vacuum and throttle control of choke being thereby modified by the temperature of the engine while stopped, or not running.

The operator now cranks the engine. Immediately the engine starts firing a vacuum is created in the intake manifold and this vacuum acting on diaphragm 63, moves arm 62, by rod 64, in clockwise direction against pressure of spring 77. This change in the position of stop 74, by finger 75, rotates lever 55, in clockwise direction and thus opens choke 51, against pressure of spring 53. Movement of arm 62, also allows spring 70 to close throttle 66, to near normal idling position. With the engine cold and arm 59 in the position shown, the extent of choke at idling speed depends wholly on the vacuum. As the engine heats up, and arm 59 thereby rotates counterclockwise, the position of arm 55, and therefore the degree of choke, may be limited by either finger 75, abutting against stop 74, or by jaw 58, abutting against arm 59. Thus the degree of choke is controlled by either vacuum, or temperature, or both. When the engine is fully heated, arm 59, abutting against jaw 58, holds choke 51, completely open. The face of jaw 58 is of such a shape that when lever 55 has moved clockwise to the full unchoke position, it forms an arc concentric with the center of arm 59, so that further movement of the thermostat as it heats up is allowed, while arm 59 still holds lever 55 positively in a full unchoke position. Thus all the ideal idling conditions are attained.

Assume the engine to be idling cold and the operator desires to run the engine. He controls speed in the usual manner by opening throttle 66, by pedal 71, spring 73a being stronger than spring 70, and rod 67, sliding through pin 68, permitting free opening of the throttle with regard to arm 62. Opening the throttle tends to unchoke valve 51, by rod 79, and spring 80, but as spring 80, is weaker than spring 70, full effect is not attained until spring 80, is fully compressed, further movement of the throttle then tending to unchoke. This tendency to unchoke, however, is resisted by jaw 57, abutting against arm 59, when the engine is cold, or cool. Thus full unchoke is prevented under these conditions, according to the degree of temperature of the engine, and also full throttle opening is prevented under like conditions. When the engine is hot, however, arm 59, has moved so that jaw 57, cannot abut against it, and full unchoke and full throttle opening are permitted.

Should the mixture become too lean, the engine will backfire through the carburetor and increase the pressure against diaphragm 63. This pressure, acting in conjunction with spring 77, will move arm 62, counterclockwise, changing the position of stop 74, and permitting full choke by spring 53. If the mixture becomes too rich and the engine starts to "buck" the operator may unchoke by opening throttle 66, fully, in which case spring 80, will be fully compressed and rod 79, will open choke valve 51, or he may unchoke by closing the throttle completely. This will immediately increase the intake manifold vacuum and by action on diaphragm 63, will rotate arm 62, clockwise, and stop 74 abutting finger 75, will move lever 55, clockwise and thus open choke valve 51.

Stalling is prevented under any conditions. Assume the engine to be idling. Immediately that it starts to slow down to near the stopping speed, pressure in the intake manifold decreases. This allows spring 77, to overcome diaphragm 63, and move arm 62, counterclockwise and thus, by pin 68 and collar 69, on rod 67, to positively move lever 65 to open throttle 66. Movement of arm 62 counterclockwise also moves stop 74 away from finger 75, and if the engine is cold, or cool, so that arm 59 does not limit movement of lever 55, the engine is also partially choked. Thus stalling is prevented by throttle opening alone when the engine is hot, and by throttle opening and partial choking when engine is cold or cool.

When the car is driving the engine at a greater speed than that provided by the throttle opening, increased vacuum is caused in the intake manifold. This acting on diaphragm 63, moves arm 62 clockwise and by stop 74, abutting against finger 75, positively rotates arm 55, to open the choke and lean the mixture.

As hereinbefore mentioned, the ideal method of temperature control is by both mixture temperature and water temperature. To do this, I provide (see Fig. 2) thermostat 92, mounted on the water jacket 93, and thus responsive to the water temperature. This thermostat has an arm 94, by rod 95, connected with lever 96, attached to thermostat 60. As the action of thermostat 92 is slower, both in heating up and cooling, than that of thermostat 60, rod 95 is provided with slot 95a, which allows free movement of thermostat 60, at the start of heating up and of cooling, but which provides the desirable retarding effect of thermostat 92, as the engine either warms or cools.

Describing the action of the manifold by-pass shown in Fig. 4, I connect the thermostat 60, directly with the arm 55, so that expansion of the thermostat tends to open the choke and contraction of the thermostat closes it. Diaphragm 63 is connected with arm 62, which rotates freely on the hub of the thermostat 60, and has a stop 74, so that action of the vacuum on diaphragm 63 tends to unchoke the carburetor. The exhaust gases from the engine enter heater manifold 137 through port 137a and exhaust through port 137b, and when valve 129 is closed, by-pass as shown by the arrow around the intake manifold, and when valve 129 is open, go directly out of port 137b. Valve 129, which is fastened to stud 130, tends to open by spring 134, attached to an arm on lever 131, but is held from opening by collar 132, on rod 133, when the engine is stopped, when spring 77, holds arm 62, in the position shown. When held shut in this position, with the manifold heater cold, it is held locked by thermostat 135, abutting against notches 136, in arm 131. By providing a series of such notches, the degree to which it is held locked shut may be controlled by the heat of the manifold. When the engine starts, vacuum acting on diaphragm 63, rotates arm 62, to pull collar 132 away from lever 131, thus allowing the temperature of the manifold 137 to control the opening of valve 129. Thermostat spring 135 allows spring 134 to completely open the valve when the manifold is hot. Thus the degree of heating by exhaust gases is controlled by the exhaust manifold temperature and the intake manifold pressure.

Controlling by combination of engine pressure, intake manifold pressure and intake manifold temperature, is illustrated in Fig. 5, where diaphragm 63 is operated by intake manifold pressure, diaphragm 109, by engine pressure, and thermostat 121 (temperature) controls the degree to which these diaphragms may control the choke. Stop 120, on rod 115, abuts against thermostat 121, when the latter is cold and prevents full opening of the choke in this condition. Stop 119 abuts against thermostat 121, when the latter is hot and prevents closure of the choke under this condition. The degree to which the temperature by thermostat 121, controls the position of the choke valve may be varied by providing stops 120 and 119, with a series of notches, coinciding with various positions of thermostat 121 as it heats up.

Control by combination of intake manifold pressure, exhaust manifold pressure and intake manifold temperature is illustrated in Fig. 7, where diaphragm 63, is operated by intake manifold pressure, diaphragm 63a by exhaust manifold pressure, and the combination of effects of these pressures is transmitted to lever 62, through lever 121, rod 125, lever 126, and rod 128, the action of thermostat 60, being the same as hereintofore described with relation to Fig. 1.

Combination of hand control and intake manifold pressure is illustrated in Fig. 8. Upon starting with a cold engine, the operator pulls dash button 142, thus yieldably moving lever 141, and positioning arm 59, to the same position as it would be moved by a cold thermostat as described in connection with Fig. 1.

The actions of arm 59, and of diaphragm, throttle valve, choke valve, etc., are the same as described in connection with Fig. 1, the only difference being that the position of arm 59, is varied by the operator instead of by the intake manifold heat, through the action of thermostat 60. By providing dash button 142 with a manual pull out, and a time delay operated push in, the action of thermostatic control may be approximated.

It will be apparent that by my invention, the combined effect of the intake manifold pressure and mixture temperature controlling the action of the choke valve, throttle valve, and heater manifold valve, I not only provide for a proper mixture for all operating conditions but eliminate a number of auxiliary features now necessary, (such as mechanism for acceleration duration fuel charge) in present carburetors, manual choke, thermostatically operated manifold heater valve, auxiliary starting devices, etc.

In Fig. 13, which corresponds to Fig. 1, a piston 63 is substituted for the diaphragm 63 of Fig. 1. Otherwise similar parts are numbered with the same numbers.

In Fig. 15 a piston 63 is shown as the equivalent of the diaphragm 63 of Fig. 3, but otherwise the parts are numbered so as to correspond.

In Fig. 14 a piston 63 is shown as substituted for the diaphragm 63 of Fig. 4. Otherwise similar parts are numbered with the same numbers.

In Figure 16 a piston 63 is shown as substituted for the diaphragm 63 of Figure 2. Otherwise similar parts are numbered with the same numbers.

This application is a continuation in part of my application, Serial No. 600,038, filed March 19, 1932.

What I claim is:

1. Starting means for an internal combustion engine incorporated in a carburetor, comprising an air entrance, a choke valve therein, a mixture outlet, a manually operated throttle valve therein, a throttle stop adapted to control the idling speed of said engine, engine temperature responsive means adapted to control the position of said stop whereby the idling speed of said engine is higher when the engine is cold than when the engine is hot, said engine temperature responsive means adapted when cold to close said choke valve, means responsive to the vacuum in the mixture outlet for opposing said temperature responsive means whereby the choke valve is opened immediately after the engine starts, a throttle lever, a choke lever, a one-way connection between said lever whereby the opening movement of the throttle opens the choke valve.

2. Starting means for an internal combustion engine incorporated in a carburetor, comprising an air entrance, a choke valve therein, a mixture outlet, a manually operated throttle valve therein, a throttle stop adapted to control the idling speed of said engine, a connection between the choke valve and the throttle valve whereby the position of the choke valve determines the idling position of the throttle valve, engine temperature responsive means adapted when cold to close said choke valve after the throttle valve has moved out of contact with the throttle stop, means responsive to the vacuum in the mixture outlet adapted under the influence of the suction in the mixture outlet to open said choke valve in opposition to said temperature responsive means whereby the choke valve is opened immediately after the engine starts, a one-way connection between the throttle valve and choke valve whereby the last opening movement of the throttle valve opens the choke valve.

3. Starting means for an internal combustion engine incorporated in a carburetor, comprising an air entrance, a choke valve therein, a mixture outlet, a manually operated throttle valve therein, a connection between the choke valve and the throttle valve whereby the position of the choke valve determines the idling position of the throttle valve, engine temperature responsive means adapted when cold to close said choke valve, means responsive to the vacuum in the mixture outlet adapted under the influence of the suction in the mixture outlet to open said choke valve in opposition to said temperature responsive means whereby the choke valve is opened immediately after the engine starts, a one-way connection between the throttle valve and choke valve whereby the last opening movement of the throttle valve opens the choke valve.

4. Starting means for an internal combustion engine incorporated in a carburetor, comprising an air entrance, a choke valve therein, a mixture outlet, a manually operated throttle valve therein, a throttle stop adapted to control the idling speed of said engine, engine temperature responsive means adapted to control the position of said stop whereby the idling speed of said engine is higher when the engine is cold than when the engine is hot, engine temperature responsive means adapted when cold to close said choke valve, means responsive to the vacuum in the mixture outlet for opposing said temperature responsive means whereby the choke valve is opened immediately after the engine starts, a one-way connection between the throttle valve and the choke valve whereby the last portion of the opening movement of the throttle valve opens the choke valve.

5. Starting means for an internal combustion engine as set forth in claim 4 in which there is a connection from the vacuum responsive means to the throttle stop adapted to move it in the direction of the closed throttle position as the vacuum increases after the engine fires.

6. Starting means for an internal combustion engine as set forth in claim 4 in which there is a one-way connection from the vacuum responsive means to the throttle stop to move it in the direction of the closed throttle position as the vacuum increases after the engine fires.

7. In an internal combustion engine an inlet passage, a heating jacket therefor, a carburetor connected thereto having an air entrance, a choke valve therein, a mixture outlet, a throttle valve therein, thermostatic means mounted adjacent to the said jacket, means interconnecting said thermostat with said throttle and with said choke so as to prevent the closure of the throttle when cold and to close the choke and to open the choke when hot and to permit the closure of the throttle, means operated by the vacuum in said passage coupled with said thermostat and adapted to assist the thermostat when hot and to oppose the operation of the thermostat when cold, and a one-way connection between the throttle valve and the choke valve whereby the last portion of the opening movement of the throttle valve opens the choke valve.

WARREN F. STANTON.